(12) United States Patent
Manber et al.

(10) Patent No.: US 8,473,200 B1
(45) Date of Patent: Jun. 25, 2013

(54) DISPLAYING LOCATION-SPECIFIC IMAGES ON A MOBILE DEVICE

(75) Inventors: Udi Manber, Palo Alto, CA (US); Barnaby M. Dorfman, Palo Alto, CA (US); Jonathan A. Gold, Palo Alto, CA (US)

(73) Assignee: A9.com, Palo Alto, CA (US)

( * ) Notice: Subject to any disclaimer, the term of this patent is extended or adjusted under 35 U.S.C. 154(b) by 0 days.

(21) Appl. No.: 13/182,387

(22) Filed: Jul. 13, 2011

Related U.S. Application Data

(62) Division of application No. 10/973,950, filed on Oct. 25, 2004, now Pat. No. 8,150,617.

(51) Int. Cl.
*G01C 21/00* (2006.01)
*G08G 1/123* (2006.01)

(52) U.S. Cl.
USPC ........... 701/428; 701/408; 701/409; 701/516; 340/991; 340/993; 340/990

(58) Field of Classification Search
USPC ........... 701/200, 213, 207, 408–409, 428, 701/516; 455/404.2, 456.1; 340/988–995.1, 340/990–991, 993; 342/450–451; 382/104; 705/26; 379/88.17; 707/E17.11
See application file for complete search history.

(56) References Cited

U.S. PATENT DOCUMENTS

| | | |
|---|---|---|
| 5,633,946 A | 5/1997 | Lachinski et al. |
| 5,757,290 A | 5/1998 | Watanabe et al. |
| 5,948,040 A | 9/1999 | DeLorme et al. |
| 6,014,608 A | 1/2000 | Seo |
| 6,026,376 A | 2/2000 | Kenney |

(Continued)

FOREIGN PATENT DOCUMENTS

| | | |
|---|---|---|
| CN | 1421828 A | 6/2003 |
| EP | 600610 A2 * | 8/1994 |

(Continued)

OTHER PUBLICATIONS

Location-based augmented reality on mobile phones; Paucher, R.; Turk, M.; Computer Vision and Pattern Recognition Workshops (CVPRW), 2010 IEEE Computer Society Conference on; Digital Object Identifier: 10.1109/CVPRW.2010.5543249 Publication Year: 2010, pp. 9-16.*

(Continued)

*Primary Examiner* — Cuong H Nguyen
(74) *Attorney, Agent, or Firm* — Novak Druce Connolly Bove + Quigg LLP

(57) ABSTRACT

A system is provided for providing location-specific images to a mobile device for display. The system generally comprises three components: a mobile device having a screen, a position identification system (e.g., a GPS receiver) that determines the position of the mobile device, and a database containing location-specific images taken at various locations. Each location-specific image is associated with geographic coordinates of the location at which the image was taken. Based on the position of the mobile device as determined by the position identification system, a location-specific image is selected from the database and displayed on the screen of the mobile device. For example, when a user is using the mobile device as a car navigation system, a location-specific image of the user's destination location can be selected and displayed when the determined position of the mobile device comes within a certain distance from the geographic coordinates of the destination location.

15 Claims, 11 Drawing Sheets

U.S. PATENT DOCUMENTS

| | | | |
|---|---|---|---|
| 6,085,135 | A | 7/2000 | Steckel |
| 6,363,161 | B2 | 3/2002 | Laumeyer et al. |
| 6,415,219 | B1 | 7/2002 | Degodyuk |
| 6,449,384 | B2 | 9/2002 | Laumeyer et al. |
| 6,504,571 | B1 | 1/2003 | Narayanaswami et al. |
| 6,526,335 | B1 | 2/2003 | Treyz et al. |
| 6,625,315 | B2 | 9/2003 | Laumeyer et al. |
| 6,711,474 | B1 | 3/2004 | Treyz et al. |
| 6,810,323 | B1 | 10/2004 | Bullock et al. |
| 6,831,665 | B2 | 12/2004 | Tsuda et al. |
| 6,871,140 | B1 | 3/2005 | Florance et al. |
| 6,947,836 | B2 | 9/2005 | Ono et al. |
| 7,013,148 | B1* | 3/2006 | Ganesh .................. 455/456.1 |
| 7,031,496 | B2 | 4/2006 | Shimano et al. |
| 7,076,452 | B2 | 7/2006 | Florance et al. |
| 7,103,472 | B2 | 9/2006 | Itabashi |
| 7,135,993 | B2 | 11/2006 | Okamoto et al. |
| 7,146,270 | B2 | 12/2006 | Nozaki et al. |
| 7,155,336 | B2 | 12/2006 | Dorfman et al. |
| 7,174,301 | B2 | 2/2007 | Florance et al. |
| 7,260,378 | B2* | 8/2007 | Holland et al. ........... 455/404.2 |
| 7,272,498 | B2 | 9/2007 | Singh |
| 7,305,076 | B1 | 12/2007 | Henderson |
| 7,308,341 | B2 | 12/2007 | Schofield et al. |
| 7,330,112 | B1* | 2/2008 | Emigh et al. ............. 340/539.13 |
| 7,389,181 | B2 | 6/2008 | Meadow |
| 7,392,296 | B2* | 6/2008 | McIntyre et al. ............. 709/219 |
| 7,455,586 | B2* | 11/2008 | Nguyen et al. ................ 463/16 |
| 7,474,959 | B2 | 1/2009 | Singh |
| 7,487,112 | B2* | 2/2009 | Barnes, Jr. ................... 705/26.8 |
| 7,539,576 | B2 | 5/2009 | Ohnishi et al. |
| 7,570,943 | B2* | 8/2009 | Sorvari et al. ............. 455/414.1 |
| 7,587,276 | B2 | 9/2009 | Gold et al. |
| 7,725,398 | B2* | 5/2010 | Dawson et al. ................. 705/54 |
| 7,756,630 | B2 | 7/2010 | Dorfman et al. |
| 8,307,046 | B2* | 11/2012 | Ortiz et al. .................... 709/217 |
| 2002/0025172 | A1 | 2/2002 | Tsuda et al. |
| 2002/0047798 | A1 | 4/2002 | Platt |
| 2002/0049534 | A1 | 4/2002 | Yuda et al. |
| 2002/0169539 | A1* | 11/2002 | Menard et al. ................ 701/200 |
| 2003/0074130 | A1 | 4/2003 | Negishi et al. |
| 2003/0100316 | A1 | 5/2003 | Odamura |
| 2003/0187704 | A1 | 10/2003 | Hashiguchi et al. |
| 2003/0210806 | A1 | 11/2003 | Yoichi et al. |
| 2003/0212567 | A1* | 11/2003 | Shintani et al. ................... 705/1 |
| 2003/0220835 | A1* | 11/2003 | Barnes, Jr. ...................... 705/14 |
| 2003/0225510 | A1 | 12/2003 | Ono et al. |
| 2003/0236752 | A1* | 12/2003 | Dawson et al. ................. 705/54 |
| 2003/0236832 | A1* | 12/2003 | McIntyre et al. ............ 709/204 |
| 2004/0015566 | A1 | 1/2004 | Anderson et al. |
| 2004/0043758 | A1* | 3/2004 | Sorvari et al. ............. 455/414.1 |
| 2004/0176958 | A1* | 9/2004 | Sorvari et al. ................ 704/275 |
| 2004/0198386 | A1* | 10/2004 | Dupray ...................... 455/456.1 |
| 2004/0199435 | A1 | 10/2004 | Abrams et al. |
| 2004/0203909 | A1* | 10/2004 | Koster ........................ 455/456.1 |
| 2004/0210382 | A1 | 10/2004 | Itabashi |
| 2004/0249565 | A1 | 12/2004 | Park |
| 2004/0260470 | A1 | 12/2004 | Rast |
| 2005/0014482 | A1* | 1/2005 | Holland et al. ............. 455/404.1 |
| 2005/0020242 | A1* | 1/2005 | Holland et al. ............. 455/404.2 |
| 2005/0020280 | A1* | 1/2005 | Holland et al. ............. 455/456.1 |
| 2005/0020281 | A1* | 1/2005 | Holland et al. ............. 455/456.1 |
| 2005/0026589 | A1* | 2/2005 | Holland et al. ............. 455/404.1 |
| 2005/0027449 | A1 | 2/2005 | Marsh |
| 2005/0037773 | A1* | 2/2005 | Holland et al. ............. 455/456.1 |
| 2005/0048946 | A1* | 3/2005 | Holland et al. ............. 455/404.1 |
| 2005/0048947 | A1* | 3/2005 | Holland et al. ............. 455/404.1 |
| 2005/0048948 | A1* | 3/2005 | Holland et al. ............. 455/404.1 |
| 2005/0090978 | A1 | 4/2005 | Bathory et al. |
| 2005/0216193 | A1 | 9/2005 | Dorfman et al. |
| 2006/0002590 | A1* | 1/2006 | Borak ........................... 382/104 |
| 2006/0004512 | A1 | 1/2006 | Herbst et al. |
| 2006/0037990 | A1 | 2/2006 | Geise |
| 2006/0063580 | A1* | 3/2006 | Nguyen et al. .................. 463/16 |
| 2006/0075442 | A1 | 4/2006 | Meadow |
| 2006/0089792 | A1* | 4/2006 | Manber et al. ................ 701/207 |
| 2006/0142935 | A1 | 6/2006 | Koerber |
| 2006/0190168 | A1 | 8/2006 | Ohnishi et al. |
| 2006/0204142 | A1 | 9/2006 | West et al. |
| 2006/0271287 | A1 | 11/2006 | Gold et al. |
| 2007/0031007 | A1 | 2/2007 | Bitar |
| 2007/0111703 | A1* | 5/2007 | Holland et al. ............. 455/404.2 |
| 2007/0132562 | A1 | 6/2007 | Fukumoto et al. |
| 2008/0268876 | A1 | 10/2008 | Gelfand et al. |
| 2008/0285886 | A1 | 11/2008 | Allen |
| 2009/0231441 | A1 | 9/2009 | Walker et al. |
| 2009/0265105 | A1 | 10/2009 | Davis et al. |
| 2011/0078243 | A1 | 3/2011 | Carpenter et al. |
| 2011/0083167 | A1 | 4/2011 | Carpenter et al. |

FOREIGN PATENT DOCUMENTS

| | | | |
|---|---|---|---|
| EP | 917103 A2 * | 5/1999 | |
| JP | 6-269017 | 9/1994 | |
| JP | 7-044538 | 2/1995 | |
| JP | 07-319383 | 12/1995 | |
| JP | 08314376 A * | 11/1996 | |
| JP | 10-110023 | 4/1998 | |
| WO | 99/62254 | 12/1999 | |
| WO | PCT/KR99/00549 | 3/2000 | |
| WO | WO 00/16292 A1 | 3/2000 | |
| WO | WO 01/25959 A2 | 4/2001 | |
| WO | WO 01/25959 A3 | 4/2001 | |

OTHER PUBLICATIONS

Point-and-shoot for ubiquitous tagging on mobile phones; Wonwoo Lee; Youngmin Park; Lepetit, V.; Woontack Woo; Mixed and Augmented Reality (ISMAR), 2010 9th IEEE International Symposium on; Digital Object Identifier: 10.1109/ISMAR.2010.5643551 Publication Year: 2010 , pp. 57-64.*

Video-Based in Situ Tagging on Mobile Phones; Wonwoo Lee; Youngmin Park; Lepetit, V.; Woontack Woo; Circuits and Systems for Video Technology, IEEE Transactions on; vol. 21 , Issue: 10; Digital Object Identifier: 10.1109/TCSVT.2011.2162767 Publication Year: 2011 , pp. 1487-1496.*

A multi-camera conical imaging system for robust 3D motion estimation, positioning and mapping from UAVs; Firoozfam, P.; Negandaripour, S.; Proceedings. IEEE Conference on Advanced Video and Signal Based Surveillance, 2003. Digital Object Identifier: 10.1109/AVSS.2003.1217908; Publication Year: 2003 , pp. 99-106.*

"iStreetView.TM. 360-Degree Geo-Coded Street Level Imaging on the Web," .COPYRGT. 2003 @City, <http://www.atcity.com> [retrieved May 3, 2004], 1 page.*

"Trimble—Mapping & GIS," .COPYRGT. 2003 Trimble Navigation Limited, <http://www.trimble.com/mappinggis.html> [retrieved Dec. 21, 2003], 1 page.*

Pepper, J., "Lovehound, the First True Mobile Dating Service, Launches in Time for Valentine's Day; No Reason to Be Alone on Valentine's Day With Lovehound," PR Newswire, Feb. 13, 2004.*

Sato, J., et al., "Change Detection in Streetscapes from GPS Coordinated Omni-Directional Image Sequences," Pattern Recognition, 2006, ICPR 2006, 18th International Conference on; vol. 4, Digital Object Identifier 10.1109/CPR.2006.360; Publication Year 2006, pp: 935-938.

Toth, C., et al., "Terrain-Based Navigation: Trajectory Recovery from LiDAR data," Position Location and Navigation Symposium, 2008 IEEE/ION; Digital Object Identifier: 10.1109/PLANS.2008.4570067; Publication Year 2008, pp. 760-765.

Firoozfam, P., et al., "A Multi-Camera Conical Imaging System for Robust 3D Estimation, Positioning and Mapping. from UAVs," Proceedings. IEEE Conference on Advanced Video and Signal Based Surveillance, 2003. Digital Object Identifier: 10.1109/AVSS.2003.1217908; Publication Year 2003, pp: 99-106.

Hagen, E., et al., "Navigation by Optical Flow," Pattern Recognition, 1992, vol. 1, Conference A: Computer Vision and Applications, Proceedings., 11th IAPR International Conference on; Digital Object Identifier: 10.1109/ICPR.1992.201657, Publication Year: 1992, pp. 700-703.

Jennings, C., et al., Cooperative Robot Localization with Vision-Based Mapping: Robotics and Automation, 1999, Proceedings 1999 IEEE International Conference on; vol. 4, Digital Object Identifier: 10.1109/ROBOT, 1999.773999, Publication Year 1999, pp. 2659-2665.

Murata, S., et al., "Onboard Locating System Using Real-Time Processing for a Self-Navigation Vehicle," Industrial Electronics, IEEE Transactions on; vol. 40, Issue 1; Digital Object Identifier: 10.1109/41.184831; Publication Year 1993; pp. 145-154.

Micheloni, C., et al., "Fast Good Features Selection for Wide Area Monitoring," Proceedings. IEEE Conference on Advanced Video and Signal Based Surveillance, 2003. Digital Object Identifier: 10.1109/AVSS.2003.1217931; Publication Year 2003, pp. 271-276.

Kanbara, T., et al., "Selection of Efficient Landmarks for an Autonomous Vehicle," Intelligent Robots and Systems '93, IROS '93. Proceedings of the 1993 IEEE/RSJ International Conference on vol. 2; Digital Object Identifier: 10.1109/IROS. 1993.58379; Publication Year 1993; pp. 1332-1338.

"iStreetView™ 360-Degree Geo-Coded Street Level Imaging on the Web," 2003, @City Inc., <http://www.atcity.com> [retrieved May 3, 2004].

"Match.com, AT&T Wireless Offer Cell-Phone Dating Service," Reuters, Feb. 12, 2003, <http://www.usatoday.com/tech/news/2003-02-12-cupid-calling_x.htm> [retrieved Sep. 14, 2004].

"MDL :: Product Range—Surveying & GIS," <http://www.mdl.co.uk/product_range_surveying.htm> [retrieved Dec. 21, 2003].

"MDL :: Product Range—VideoAce," <http://www.mdl.co.uk/products_videoace.htm> [retrieved Dec. 21, 2003].

"Nextel—GPS Navigate," 1995-2004, Nextel Communications, <http://www.nextel.com/about/enterprise/wbs/gps/navigate.shtml> [retrieved Oct. 12, 2004].

"Red Hen Systems," 1994-2003, Red Hen Systems, Inc., <http://www.redhensystems.com...> [retrieved Dec. 18, 2003].

"Trimble—Mapping & GIS," 2003, Trimble Navigation Limited, <http://www.trimble.com/mappinggis.html> [retrieved Dec. 21, 2003].

Emily, "Virtual Cell Phone Dating," Jun. 29, 2003, http://textually.org/textually/archives/000973.htm [retrieved Sep. 14, 2004].

Hinman, K., "From Chimney Pot to Loge, a Virtual Close-Up of Paris," 2003, The New York Times Co., Apr. 3, 2003, 2 pages.

Lin-Eftekhar, J., "Virtual Los Angeles Today—a Virtual World Tomorrow," Quest, 2000, pp. 4-8, 40.

Pepper, J., "Lovehound, the First True Mobile Dating Service, Launches in Time for Valentine's Day; No Reason to Be Alone on Valentine's Day with Lovehound," PR Newswire, Feb. 13, 2004, <http://ww.findarticles.com/p/articles/mi_m4PRN/is_2004_Feb_13/ai_113228404> [retrieved Sep. 14, 2004].

Reyes, D., "Orange County Freezes Ambitious Aerial Photography Project," Los Angeles Times Newspaper, Metro Section, Oct. 16, 2000, pp. B1, B5.

Takahashi, T. et al., "Arbitrary View Position and Direction Rendering for Large-Scale Scenes," Conference Paper Computer Vision and Pattern Recognition 2000: IEEE Conference on Computer Vision and Pattern Recognition, Institution of Electrical Engineers, Hilton Head Islands, SC USA, Jun. 13, 2000.

Kawasaki, H. et al., "Automatic Modeling of a 3D City Map from Real-World Video," Proceeding of the Seventh ACM International Conference on Multimedia, Association for Computing Machinery, New York, NY USA, 1999 (8 pages).

RF Neulink, Wireless Data Solutions, RF Industries, RFI Website, Nov. 11, 2003, New Product Release, San Diego, CA.

* cited by examiner

DISPLAYING LOCATION-SPECIFIC IMAGES ON A MOBILE DEVICE

CROSS-REFERENCE TO RELATED APPLICATIONS

The present application is a divisional of, and claims priority to, co-pending U.S. patent application Ser. No. 10/973,950, entitled "System and Method for Displaying Location-Specific Images on a Mobile Device," filed Oct. 25, 2004, which is hereby incorporated herein by reference.

TECHNICAL FIELD

The present invention is related to providing location-specific services to mobile devices, and more specifically, to displaying a location-specific image on a mobile device based on a determined position of the mobile device.

BACKGROUND

Various types of mobile devices are available to transmit/receive various information wirelessly, such as cellular phones, personal digital assistants (PDAs), Blackberry® devices, etc. These devices can store and process an increasing amount of information, including real-time images in the form of a video clip. Many of these devices include a color screen that can display images (graphics) as well as text. Further, some of these devices are equipped with a global positioning system (GPS) receiver so as to function as a navigation system, in addition to functioning as a communications device. As is well known in the art, a navigation system can receive a destination location from a user, calculate suitable directions to go from the user's current position, as determined based on data obtained by the GPS receiver, to the destination location, and display the directions together with a relevant map on its screen. The directions and a map as displayed on the screen are constantly updated based on the current (moving) position of the user as determined based on data obtained by the GPS receiver. Current navigation systems, however, do not display a ground-level image of the destination location (i.e., an image taken at the destination location), or any other images of locations that the user will pass along the way toward the destination location. A ground-level image, as used herein, means an image that shows an object (e.g., a business storefront) in the manner actually perceived by people on the ground, as opposed to aerial or rooftop images. It would be helpful for the user to be able to view such images on the screen of the navigation system so that the user can look for particular objects (e.g., buildings, intersections, etc.) shown in the images of the destination location and any other landmark points along the directions, especially when traveling in an unfamiliar area. More particularly, what is lacking is a system and method for displaying location-specific images (i.e., ground-level images of objects taken at particular locations) on a mobile device, such as a cellular phone and a car navigation system, based on the determined position of the mobile device.

BRIEF SUMMARY

The present invention provides methods and systems whereby a mobile device, such as a cellular phone or a car navigation system, may display location-specific images based on the position of the mobile device as determined by a position identification system, such as a GPS system. To that end, a database of location-specific images is provided, wherein each image is associated with the geographic coordinates (e.g., longitude/latitude coordinates) of the location at which the image was taken. In various exemplary embodiments of the present invention, each image associated with its geographic coordinates is further correlated with its street address (or its business name, for example) so that the image can be retrieved and displayed based on a user input of its street address (or business name, etc.) The construction and use of such a database are disclosed in detail in co-pending U.S. patent application Ser. No. 10/809,049, filed Mar. 24, 2004, which is explicitly incorporated herein by reference.

Thus, for example, a user of a car navigation system will be able to enter a destination location using its street address, and the method and system of the present invention will permit the car navigation system to display the image of the destination location and additional images of other landmark points along the way toward the destination location in addition to the usual maps-and-directions to the destination location. The timing at which each of these location-specific images is to be displayed will depend on the current position of the car navigation system as determined by its position identification system (e.g., GPS system). In one example, an image of a landmark point will be displayed when the car navigation system comes within a certain distance from the landmark point with an appropriate text message, such as "Look for this, and turn left at this." Likewise, an image of the final destination location may be displayed when the car navigation system comes within a certain distance from the destination location, or whenever the user requests to view such an image, with an appropriate text message, such as "Look for this at your destination." Timely display of these location-specific images will assist the user in following the directions and finding the final destination location easily. Further, the image of a destination location may be displayed at the beginning (prior to starting the user's journey to the destination location) so as to assist the user in deciding whether or not to go there (e.g., based on how appealing the image of the destination location looks to the user), remembering whether the user has been there before, etc.

In one embodiment, the location-specific images are provided to a mobile device through a wireless communications network from a centralized database. In another embodiment, the location-specific images may be pre-stored in the mobile device via a hard disk (including DVD, CD, etc.).

In one application, instead of discrete images, a video clip that displays a moving view of an entire trip or a part thereof can be downloaded (or pre-stored) and displayed on a mobile device.

In a further application, the location-specific images (including video images) may be transferred not only from a centralized database to mobile devices, but also from the mobile devices to the database. For example, if a mobile device, such as a cellular phone, has an image capturing capability, the user of the mobile device can take an image at a particular position, and the image can be automatically coded with the geographic coordinates of the position of the mobile device when the image is taken as determined by the position identification system (e.g., GPS receiver), and then the geo-coded image can be transferred from the mobile device to the database so as to continuously update and/or expand the database.

Generally, in accordance with various exemplary embodiments of the present invention, a system is provided for providing location-specific images to a mobile device for display. The system is generally comprised of three components: a mobile device having a screen, a position identification system (e.g., a GPS receiver) that determines the position of the mobile device, and a location-specific images database including images taken at various locations, wherein each image is associated with geographic coordinates of the location at which the image was taken. The position of the mobile device is identified by the mobile device position identification system, and a location-specific image is selected from the database based on the determined position of the mobile device and displayed on the screen of the mobile device. For example, the location-specific image is selected when the determined position of the mobile device comes within a certain distance from the geographic coordinates associated with the image.

The system may be adapted to selectively display location-specific images on a mobile device in various contexts. For example, the system may be applied to provide shopping assistance to a user of the mobile device. In this application, the system receives at the mobile device a shopping list from the user including one or more items that the user wishes to purchase. For each of the items in the shopping list, the system identifies one or more businesses that carry the item. Then, for each of the one or more identified businesses, the system determines its geographic coordinates and further identifies its corresponding location-specific image. Finally, the system generates a shopping list program comprising instructions for displaying on the screen of the mobile device an image of one of the one or more identified businesses based on the determined position of the mobile device. For example, the system may display a location-specific image of a particular business that carries an item included in the user's shopping list when the business is determined to be within a certain distance from the determined position of the mobile device. An audio alarm may be issued when the image is displayed to further alert the user that the relevant business is near.

As another example, the system may be applied to recommend "favorite" places to visit to a user of the mobile device. In this application, the system, upon receiving from the mobile device a user's request for a recommendations service, accesses a profile of the user of the mobile device in a user profiles database to identify one or more favorite places of the user. The favorite places may be those places that the user has previously explicitly entered as his/her favorites, or may be presumed based on the user's past behavior on the system, for example, destination locations that the user has previously entered in a navigation service. The system then determines geographic coordinates of the one or more favorite places. Finally, the system generates a favorite places program comprising instructions for displaying on the screen of the mobile device an image of any of the one or more favorite places based on the determined position of the mobile device. For example, the system may display a location-specific image of a particular favorite place of the user when the favorite place is determined to be within a certain distance from the determined position of the mobile device.

In accordance with a further aspect, the present invention provides a method of displaying a location-specific image on a mobile device based on the position of the mobile device. The method generally includes three steps. First, a position of a mobile device is received. Second, a location-specific image is selected from multiple location-specific images based on the received position of the mobile device, wherein each location-specific image is associated with geographic coordinates of the location at which the image was taken. Third, the selected image is displayed on the mobile device.

In accordance with a still further aspect, the present invention provides a mobile device capable of displaying a location-specific image based on a determined position of the mobile device. The mobile device generally consists of two elements: a screen and a processor. The processor is loaded with processor-executable instructions for generally performing three steps. The first step involves receiving a position of the mobile device as determined by a position identification system. The second step involves selecting a location-specific image from a set of location specific images based on the determined position of the mobile device. The third step involves displaying the selected location-specific image on the screen. In an application wherein the set of images is stored in an images database external to the mobile device, a location-specific image is selected from the database based on the determined position of the mobile device, and is transmitted over a wireless communications network to the mobile device for display. In another application wherein the set of images is stored in a memory of the mobile device, a location specific image is selected from the memory based on the determined position of the mobile device and displayed on the screen.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present disclosure includes systems and methods for providing a mobile image service. The mobile image service, as used herein, refers to one or more services that provide and display location-specific images on a mobile device based on the determined position of the mobile device. A location-specific image, as used herein, refers to an image taken at a location, and is thus associated with the geographic coordinates (e.g., longitude/latitude coordinates) of the location at which the image was taken. In various exemplary embodiments, location-specific images are ground-level location-specific images that show objects as generally perceived by people on the ground, as opposed to aerial or rooftop images. The following detailed description provides several exemplary implementations of the mobile image service. Although specific system configurations and flow diagrams are illustrated, it should be understood that the examples provided are not exhaustive and do not limit the invention to the precise forms disclosed. Persons having ordinary skill in the field of digital data processing will recognize that the computer components and the arrangements described herein may be interchangeable with other components and arrangements, and further that the process steps described herein may be interchangeable with other steps or combinations thereof and still achieve the benefits and advantages of the present invention.

Figure 1A:
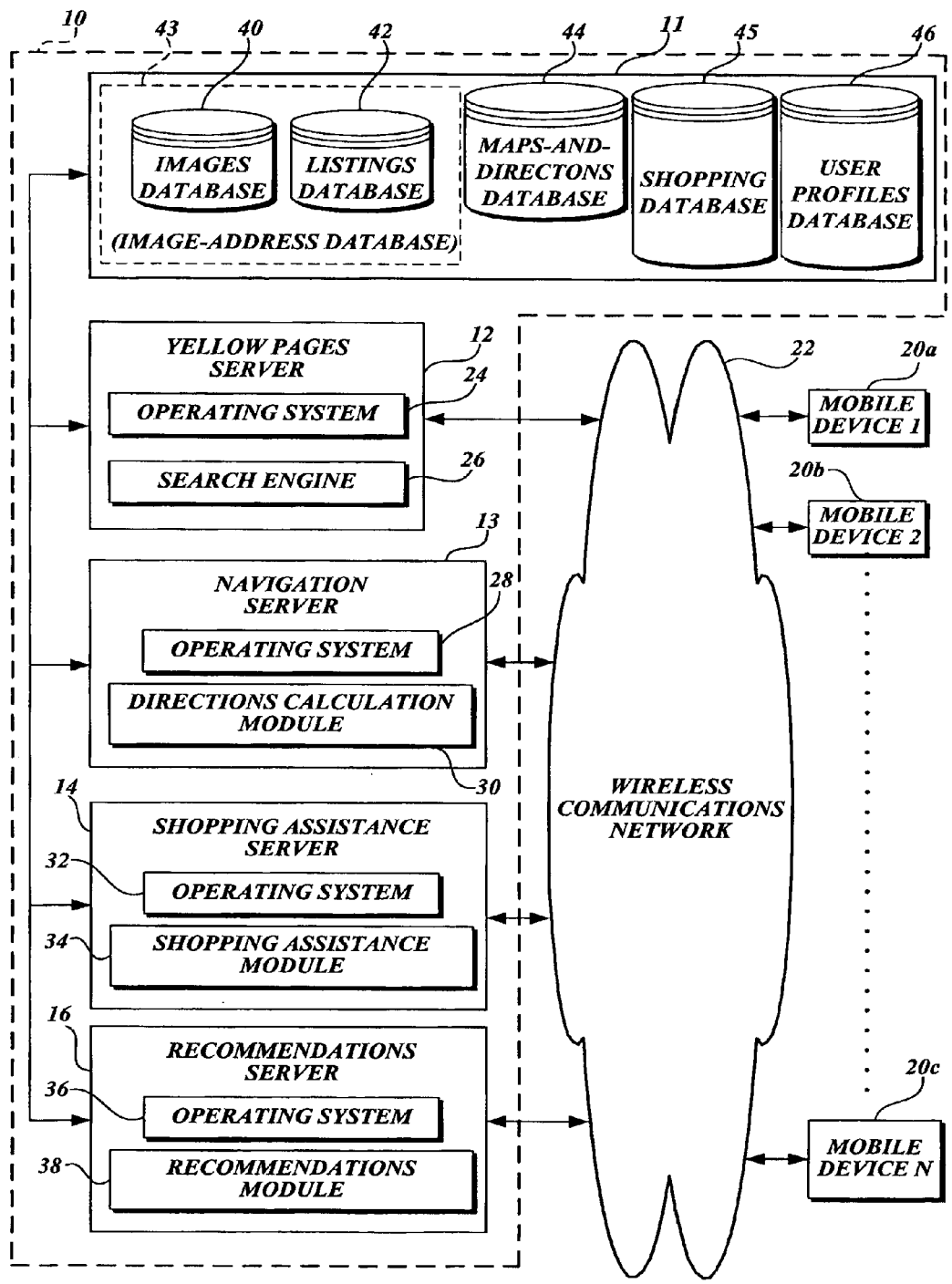
FIG. 1A is a block diagram showing an environment and arrangement of certain computing components for implementing a mobile image service according to one embodiment of the present invention.

FIG. 1A illustrates an exemplary overall environment for implementing a mobile image service, which includes a mobile image system 10 including various servers (a database server 11, a Yellow Pages server 12, a navigation server 13, a shopping assistance server 14, and a recommendations server 16) for supporting the mobile image service and one or more mobile devices 20a, 20b, and 20c (collectively referred to as "the mobile devices 20"). The mobile image system 10 resides on a network, such as the Internet, and the mobile image system 10 and the mobile devices 20 are connected with each other via any suitable wireless communications network 22, such as an Internet-enabled wireless communications network that provides the mobile devices 20 with wireless access to the mobile image service available from the mobile image system 10.

The wireless communications network 22 utilizes any one of a variety of wireless communications mediums and/or communication methods to transfer data. Examples of suitable wireless communications mediums/methods include, but are not limited to, wireless telephony, personal communications service (PCS), short message service (SMS), wireless application protocol (WAP), IEEE 802.XX wireless LAN (WLAN) including a Wireless-Fidelity (Wi-Fi) and Wi-Max networks, two-way paging networks, specialized mobile radio systems, non-licensed personal area network (PAN) technology, such as the Bluetooth protocol, and infrared links. Further, the wireless communications network 22 may employ Internet Protocol (IP) addressing. Accordingly, the mobile devices 20 can be any devices that communicate with the chosen wireless communications network 22, such as cellular phones, personal digital assistants (PDAs), mobile computer communicators, such as Blackberry® devices, etc., to be fully described in reference to FIG. 1B below. The wireless communications network 22 may also include a network that is in part a wired network. For example, the servers 11, 12, 13, 14, and 16 of the mobile image system 10 may be interconnected on a wired network with which the mobile devices 20 interface wirelessly.

In one embodiment, the mobile devices 20 communicate with the mobile image system 10 via the wireless communications network 22 using IP addressing. Protocols and components for communicating wirelessly to and from the Internet are well known to those of ordinary skill in the art of computer network communications. Generally, each of the mobile devices 20 may execute any suitable user interface (UI) application (not shown) that understands given protocols for communicating with the mobile image system 10 via the network 22. Examples of suitable UI applications include, but are not limited to, a Web browser application, .NET™ application, JAVA® application, such as J2EE® application, Pocket Outlook™ application, any custom-designed standalone UI application, etc. Each of these UI applications permits a user of the mobile device 20 to download, upload, display, or otherwise access resources and services available from the mobile image system 10 and, in particular, provides the user with a graphical user interface (GUI) to the mobile image system 10. The mobile image system 10 as depicted in FIG. 1A operates in a distributed computing environment comprising several computer systems that are interconnected by communication links, e.g., using one or more computer networks or direct connections. However, it will be appreciated by those of ordinary skill in the art that the system 10 could equally operate in a computer system having fewer or greater number of components than are illustrated in FIG. 1A. For example, each of the servers depicted in FIG. 1A may be implemented using a greater number of computing systems so that each of the various services (collectively referred to as the "mobile image service") provided by the mobile image system 10 may be performed by a cluster of different computing devices. As another example, components of the mobile image system 10 and the mobile device 20 may be reduced to a single computer system (i.e., embedded in the mobile device 20), as will be more fully described below. Therefore, the description of the mobile image system 10 in FIG. 1A should be taken as exemplary, and not limiting the scope of the invention.

The illustrated embodiment of the mobile image system 10 includes a database server 11, a Yellow Pages server 12, a navigation server 13, a shopping assistance server 14, and a recommendations server 16. The database server 11 includes various databases, such as an images database 40, listings database 42, maps-and-directions database 44, shopping database 45, and user profiles database 46. These databases contain various data to be used by the servers of the mobile image system 10, as will be fully described below.

The Yellow Pages server 12 includes an operating system 24 and a search engine 26. The details of the Yellow Pages server 12, together with construction of the images database 40 and the listing database 42, are described in U.S. patent application Ser. No. 10/809,049, incorporated above. Briefly, the Yellow Pages server 12 is a Web page server that supports an online Yellow Pages Web site, at which each listing (e.g., business) can be displayed together with an image of the listing (e.g., an image of the business storefront). The Yellow Pages server 12 communicates text and graphics organized as a Web page using, for example, hypertext transfer protocols, in response to requests and search queries received from any of the mobile devices 20. It should be noted that while the present description is provided in the context of an online business directory (e.g., Yellow Pages) at which each business listing is associated with an image of its geographic location, the same concept can be applied to create and publish online residential directories (e.g., White Pages) in which each individual listing is associated with an image of its geographic location (e.g., an image of a house). Therefore, the term "Yellow Pages" as used herein may refer to other types of directories as well, including White Pages.

The listings and their associated location-specific images, which are processed by the Yellow pages server 12, are stored in the listings database 42 and the images database 40, respectively, within the database server 11, in accordance with one embodiment of the present invention. It should be understood by those skilled in the art that a particular configuration of the databases is not limited to what is disclosed in FIG. 1A, and the databases shown to be included in the database server 11 may be arranged in a distributed manner or may be consolidated into a fewer number of databases, etc. The listings database 42 stores information generally found in conventional Yellow Pages in a searchable form, e.g., listings (business names together with their addresses, phone numbers, etc.) searchable by their business names, addresses, phone numbers, business types, etc. The listings database 42 may further store each listing in association with its geographic coordinates (e.g., longitude/latitude coordinates). As used herein, geographic coordinates refer to various types of geographic identifiers used in suitable position-identification systems, including the two axes-based global coordinates system (i.e., longitude/latitude coordinates), a two axes-based local or customized coordinates system, or any other addressing system that uniquely identifies a geographic location. The images database 40 contains digitized images of the business listings taken at their geographic locations in association with their geographic coordinates. Thus, between the images database 40 and the listings database 42, each image is associated with its geographic coordinates and is further correlated with its street address. A combination of the images database 40 and the listings database 42 is therefore referred to as an image-address database 43.

In operation, upon receiving a search request from users of the mobile devices 20, the Yellow Pages Server 12 conducts a searches of the listings database 42 and the images database 40, and identifies and transmits appropriate listings together with their images over the network 22 to the requesting mobile devices 20 for display. The administration and overall operation of the Yellow Pages server 12 is controlled by its operating systems 24, while its search function is performed by the search engine 26 in cooperation with the image-address database 43. The image-address database 43 is configured to receive search instructions from the search engine 26 and to return search results thereto. Those of ordinary skill in the art will recognize that the Yellow Pages server 12 and the image-address database 43 will each typically employ a memory and main processor in which program instructions are stored and executed for their operation. In combination, the Yellow Pages server 12 and the image-address database 43 permit users of the mobile devices 20 to search and view online Yellow Pages in which each listing (e.g., business) is displayed with an image of an object (e.g., business building) taken at its geographic location. Since each image is correlated with its street address in the image-address database 43, the users can search for and view an image of a business based on its street address (or based on any other data associated with the business listing in the listings database 42).

Figure 1B:
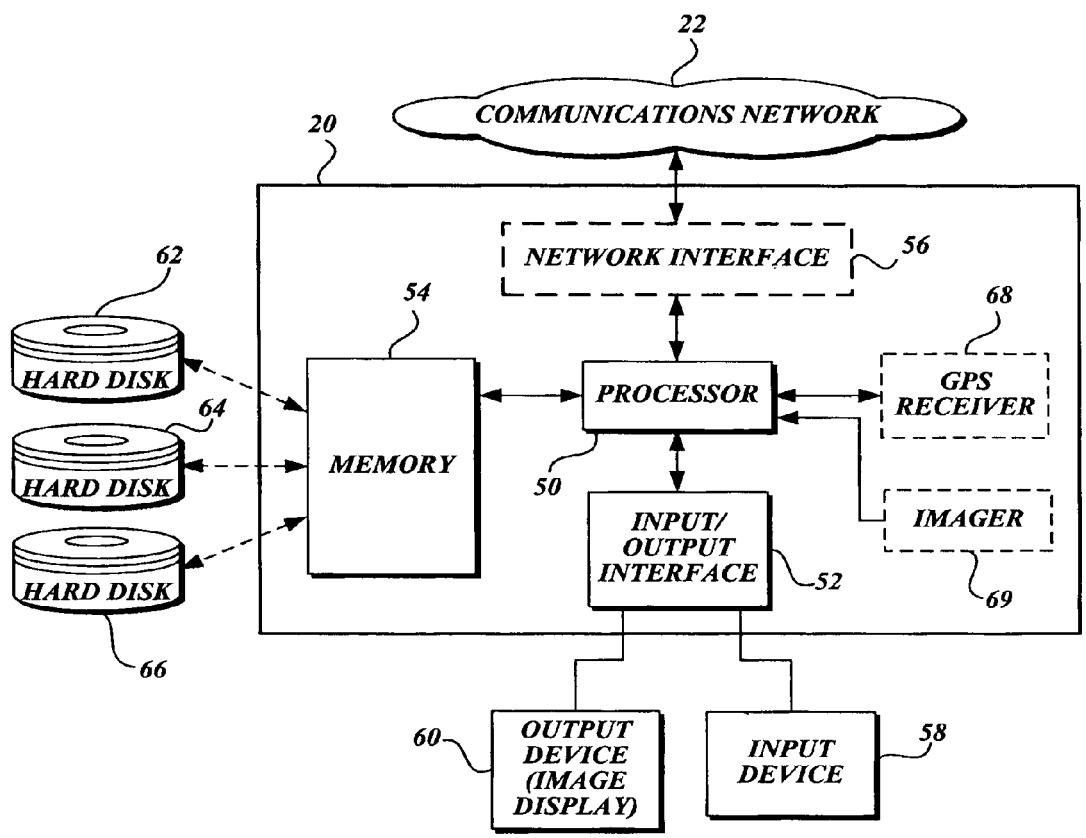
FIG. 1B is a diagram illustrating an exemplary configuration of a mobile device, suitable for use in receiving the mobile image service in accordance with one embodiment of the present invention.

FIG. 1B illustrates an exemplary configuration of a mobile device 20 suitable for use in the present invention. In various exemplary embodiments of the present invention, a mobile device 20 may be any device that communicates with a chosen wireless communications network 22, such as cellular phones, personal digital assistants (PDAs), mobile computer communicators, such as Blackberry® devices, portable (mobile) computers, such as laptop computers, Webpads, tablets, and other computing devices having some type of memory, etc. In the illustrated embodiment, the mobile device 20 includes a processor 50 in communication with an input/output interface 52, a memory 54, and a network interface 56 for interfacing with the wireless communications network 22. The input/output interface 52 enables the processor 50 to communicate with various input and output devices. Input devices 58 may include any computing elements that provide input signals to the processor 50, such as a keyboard, a mouse, a speech recognition application, such as Microsoft® Speech.NET™ application, etc. Output devices 60 may include typical output devices, in particular a screen display. The processor 50 is configured to operate in accordance with computer program instructions stored in a memory, such as the memory 54. Program instructions may also be embodied in the hardware format, such as one or more programmed digital signal processors. In one application, location-specific images are stored in the images database 40 of the mobile image system 10 (see FIG. 1A) and transmitted over the wireless communications network 22 to be received by the mobile device 20 for display on its screen 60. In another application, a set of location-specific images, for example, a set of location-specific images corresponding to the general area of interest to the user, may be transmitted over the wireless communications network 22 to be pre-stored in the memory 54 (for example, a hard drive) of the mobile device 20, and the pre-stored images can then be retrieved and displayed on the screen 60.

In a further application, location-specific images may be pre-stored in a hard disk (including DVD, CD, etc.), such as in a Yellow Pages hard disk 62, a navigation hard disk 64, and a shopping assistance hard disk 66, and may be loaded onto the memory 54 of the mobile device 20. Essentially, the images to be displayed on the mobile device 20, together with their associated computer instructions, for use in providing the Yellow Pages service, the navigation service, and the shopping assistance service, respectively, may be stored in these disks. These hard disks are received by a disk drive (forming part of the memory 54) of the mobile device 20 for storage. For example, the mobile device 20 may be a car navigation system without a wireless communications capability to which different sets of location-specific images in the form of different hard disks can be loaded depending on the particular general area of interest to the user. In this application, it is not necessary for the mobile device 20 to retrieve location-specific images from the images database 40 of the mobile image system 10 over the wireless communications network 22.

In various exemplary embodiments of the present invention, the functionality provided by the mobile image system 10 is best described in terms of services. The present invention offers various mobile image services, in each of which a mobile device 20 displays a location-specific image that is selected based on the determined position of the mobile device 20. These services may be provided by the servers, each of which is depicted as a single computing device for ease of illustration in FIG. 1A, or may be provided by a greater number of computing devices than shown in FIG. 1A. As known to those skilled in the art, any stand-alone server may be supported by multiple computer systems connected together by a local area network or other communication mechanism. As another example, the services may be provided by the mobile device 20 itself when it locally stores all necessary data and instructions (program code) in its memory device, as described above. Accordingly, it should be understood that the term "mobile image system" as used herein encompasses various hardware configurations for implementing the mobile image services of the present invention, and is not limited to the particular configuration depicted in FIG. 1A.

In accordance with the present invention, a location-specific image to be displayed on the screen 60 of the mobile device 20 is selected based on the position of the mobile device 20 as determined by a position identification system. In the present description, the term "position identification system" is used to refer to any system that is capable of identifying the geographic position of the mobile device 20 so as to permit selection of location-specific images for display based on the determined position. The position identification system may utilize device-based technologies, i.e., technologies that permit the mobile device 20 to self-identify its position. An example of using such technologies is to equip the mobile device 20 with a global positioning system (GPS) receiver 68, as shown in FIG. 1B. Alternatively, the position identification system may utilize network-based technologies, wherein the position of the mobile device 20 is identified based on a communication link connecting the mobile device 20 and the mobile image system 10 over the wireless communications network 22 (see FIG. 1A). For example, certain cellular phone systems track the strength, the angle, and the arrival time difference of transmission signals for determining a cell phone's position, using time difference of arrival (TDOA) technology or timing advance (TA) location measurement technology. In this embodiment, the position of the mobile device 20 is identified by the overall wireless communications network 22, perhaps at its base station (not shown), and the identified position may be relayed to the mobile device 20 and/or the mobile image system 10 to select suitable location-specific images for display based on the identified position of the mobile device 20. Further alternatively, the position identification system may utilize a combination of both device-based technologies and network-based technologies.

A variety of position identification systems, utilizing device-based technologies and/or network-based technologies, are under development and/or available, as is well known in the art. When the mobile device 20 consists of a cellular phone, the position identification system may be in compliance with the wireless Enhanced 911 standard prescribed by the United States Federal Communications Commission ("the wireless E911 standard"). The wireless E911 standard mandates that cellular phone service providers within the United States provide the capability to locate the position of a cellular phone making an emergency (911) call within the provider's system. Other position identification systems may be in compliance with similar standards prescribed in other countries. It should be noted that a position identification system in accordance with the present invention is capable of identifying the position of the mobile device (e.g., a cellular phone) with respect to any "calls" placed to any numbers, IP addresses, etc., and is not limited to emergency calls.

Therefore, the determination of the position of the mobile device 20 may or may not be performed by the mobile device 20 itself. Specifically, if a particular embodiment of a position identification system is such that the mobile device 20 is configured to self-identify its position (e.g., using a GPS receiver), then the mobile device 20 is equipped with such a position identification system, and the position identification system, perhaps in conjunction with the processor 50 of the mobile device 20, will determine the position of the mobile device 20. The mobile device 20 (or, more specifically, its processor 50) will then carry out suitable instructions to select location-specific images for display based on the determined position of the mobile device 20. On the other hand, in another embodiment of the position identification system, the position of the mobile device 20 may be determined by the overall wireless communications network 22 (e.g., using TDOA technology) without having the mobile device 20 perform any particular functions other than being turned on and transmitting/receiving signals to/from the network 22. In such a case, the determined position of the mobile device 20 may or may not be relayed to the mobile device 20, and selection of suitable location-specific images based on the determined location of the mobile device 20 may be performed by the mobile device 20 and/or the mobile image system 10.

Those having ordinary skill in the art of computers will recognize that a wide selection of commercially available components and arrangements can be used to construct a system, such as the mobile device system 20 illustrated in FIG. 1B.

Figure 1C:
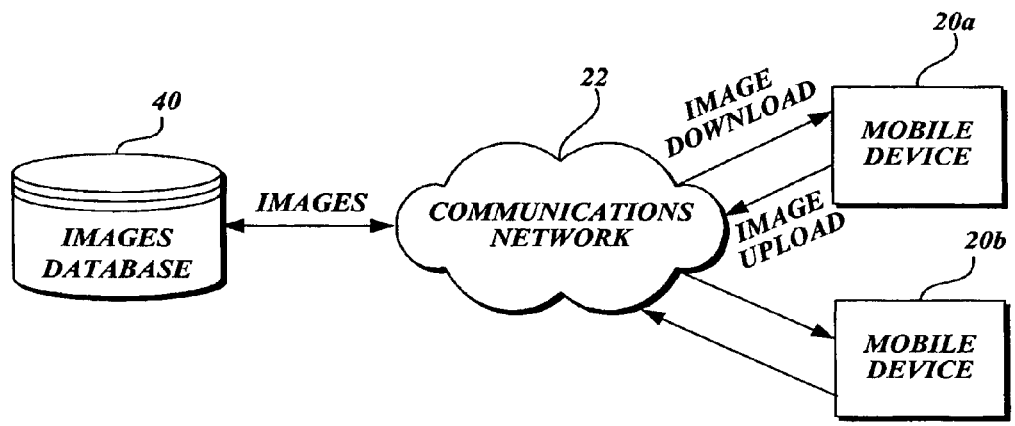
FIG. 1C is a pictorial diagram illustrating two-way transfer of location-specific images between an images database and one or more mobile devices through a network as implemented in various exemplary embodiments of the present invention.

FIG. 1C illustrates two-way transfer of location-specific images between the images database 40 of the mobile image system 10 and the mobile device 20 over the wireless communications network 22. When the mobile device 20 has an image capturing capability (e.g., including a digital camera 69 as shown in FIG. 1B), the processor 50 of the mobile device 20 may associate the captured image with the position of the mobile device 20 at the time the image was taken (as determined by any suitable position identification system, described above) to produce a location-specific image (i.e., an image associated with the geographic coordinates of the location at which the image was taken). The location-specific image can then be transmitted over the wireless communications network 22 to be included in the images database 40 within the mobile image system 10. Thus, the images database 40 can be constantly updated and/or expanded by receiving additional location-specific images uploaded from the mobile devices 20. For example, when a location-specific image associated with particular geographic coordinates is of poor quality (blurred, partially hidden by an obstructing object such as a passing pedestrian, etc.), a user of the mobile device 20 can take a high-quality image at the same location and upload the image to replace the poor-quality image. As further examples, a user of the mobile device 20 can upload a location-specific image for the purpose of receiving a specific service. As a specific example, when a user is locked out of a car, house, etc., the user can take an image of his location including the car, house, etc, and send the location-specific image via the wireless communications network 22 to a locksmith whose computing device has a display. The location-specific image sent by the user will be displayed on the computing device of the locksmith, together with its associated address, so that the locksmith can readily determine and reach the location of the user.

Referring back to FIG. 1A, the mobile image system 10 may further include the navigation server 13, including an operating system 28 and a directions calculation module 30. The navigation server 13, in conjunction with the image-address database 43 and the maps-and-directions database 44 in the database server 11, provide and display location-specific images on the mobile device 20 as part of a navigation program based on the determined position of the mobile device 20. In particular, the navigation server 13 generates a navigation program which, when executed on the mobile device 20, will display not only the relevant maps-and-directions to a destination location, but also various location-specific images of the destination location and any landmark points along the way. The administration and overall operation of the navigation server 13 is controlled by its operating system 28, while its function for calculating directions and generating a directions program is performed by the directions calculation module 30 in cooperation with the maps-and-directions database 44, the images database 40, and the listings database 42, for example.

Figure 2:
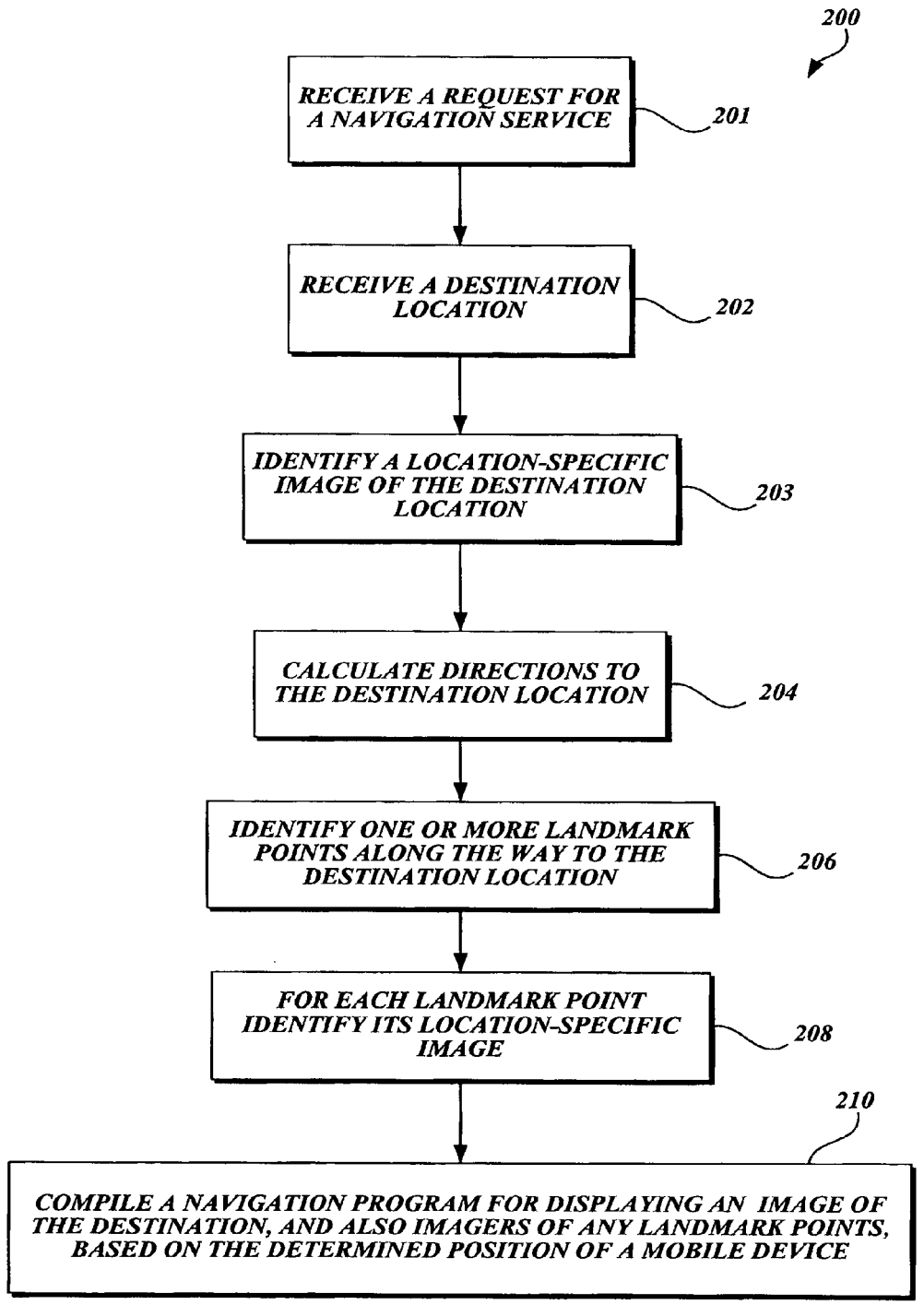
FIG. 2 is a flow diagram of one exemplary method for generating a navigation program which upon execution will display one or more location-specific images based on the determined position of a mobile device according to one embodiment of the present invention.

FIG. 2 illustrates a sample routine 200 to be performed by the directions calculation module 30 to generate a navigation program that incorporates various location-specific images to be displayed on the mobile device. At block 201, the directions calculation module 30 receives a request for a navigation service from a mobile device 20. At block 202, the directions calculation module 30 further receives a desired destination location from the mobile device 20. For example, the user of the mobile device 20 may type in the address or the business name of the destination location on the mobile device 20, and the information is received by the directions calculation module 30.

At block 203, based on the received destination location, the directions calculation module 30 identifies a location-specific image of the destination location. Specifically, for example, the module 30 may request the search engine 26 of the Yellow Pages server 12 to search through the listings database 42 to identify a particular listing corresponding to the destination location as entered by the user. Once a particular listing is identified, it may then be used to identify a location-specific image of the destination location as stored in the images database 40. The identified location-specific image is associated with the geographic coordinates of the location (i.e., the destination location in this case) at which the image was taken.

In one application, when the mobile device 20 is associated with an IP address, then the IP address may be used to determine a general geographic position of the mobile device 20 thereby selecting a subset of listings that generally correspond to the determined geographic position. For example, when the mobile devices 20 access the navigation server 13 and the image-address database 43 over the wireless communications network 22, it may be preferable to first limit a number of possible listings (and hence their corresponding location-specific images) to search through, especially when the data size contained in the image-address database 43 is large. Most IP addresses are associated with a server that is physically proximate to the locations of the IP address owners. Thus, based on an IP address of the mobile device 20, it is possible to estimate a general geographic position (e.g., city) of the mobile device 20. Then, only those listings corresponding to the general geographic position may be searched, at least initially, to find a listing corresponding to the destination location. Thereafter, a location-specific image corresponding to the listing can be found.

At block 204, the directions calculation module 30 calculates directions from the current position of the mobile device, as determined by any suitable position identification system as described above, to the destination location in reference to the maps-and-directions database 44. Various methods of calculating directions are well known in the art.

Optionally, at block 206, the directions calculation module 30 may then identify one or more landmark points along the calculated directions. For example, any predefined points of interest, such as major intersections, large buildings, parks, etc. can be designated as landmark points in the maps-and-directions database 44. The module 30 automatically selects one or more landmark points along the calculated directions according to any suitable algorithm. For example, the module 30 may select landmark points at a certain interval. As another example, each of the landmark points may be pre-rated according to its importance (or preference), and only those landmark points above a certain preference level may be selected in each application, for example according to a user input.

At block 208, for each of the landmark points identified, the geographic coordinates are found from the maps-and-directions database 44, and may then be used to find a location-specific image taken at the geographic coordinates from the images database 40.

At block 210, the directions calculation module 30 compiles a navigation program for displaying on the mobile device 20 an image of the destination location, in addition to the ordinary directions and maps for navigating the user to the destination location. The navigation program may be further configured to display images of one or more landmark points along the way to the destination location. Each of these images will be displayed based on the position of the mobile device 20 as determined by the position identification system (e.g., a GPS receiver). Additionally, in one application, the images of the landmark points and the destination location, or any portion thereof, may be stored and/or presented in the form of a video clip. In this application, essentially all locations along the way toward the destination location that are associated with location-specific images (or a portion thereof) are designated as landmark points, and their location-specific images are included in a video clip.

It should be understood that the directions calculation module 30, together with its associated databases, such as the images database 40, the listings database 42, and the maps-and-directions database 44, may be contained in a hard disk 64 and stored in the memory 54 of the mobile device 20. (See FIG. 1B). Thus, essentially, the navigation service as described above may be made available to the mobile device 20 that may not necessarily interface with a wireless communications network 22.

Figure 3:
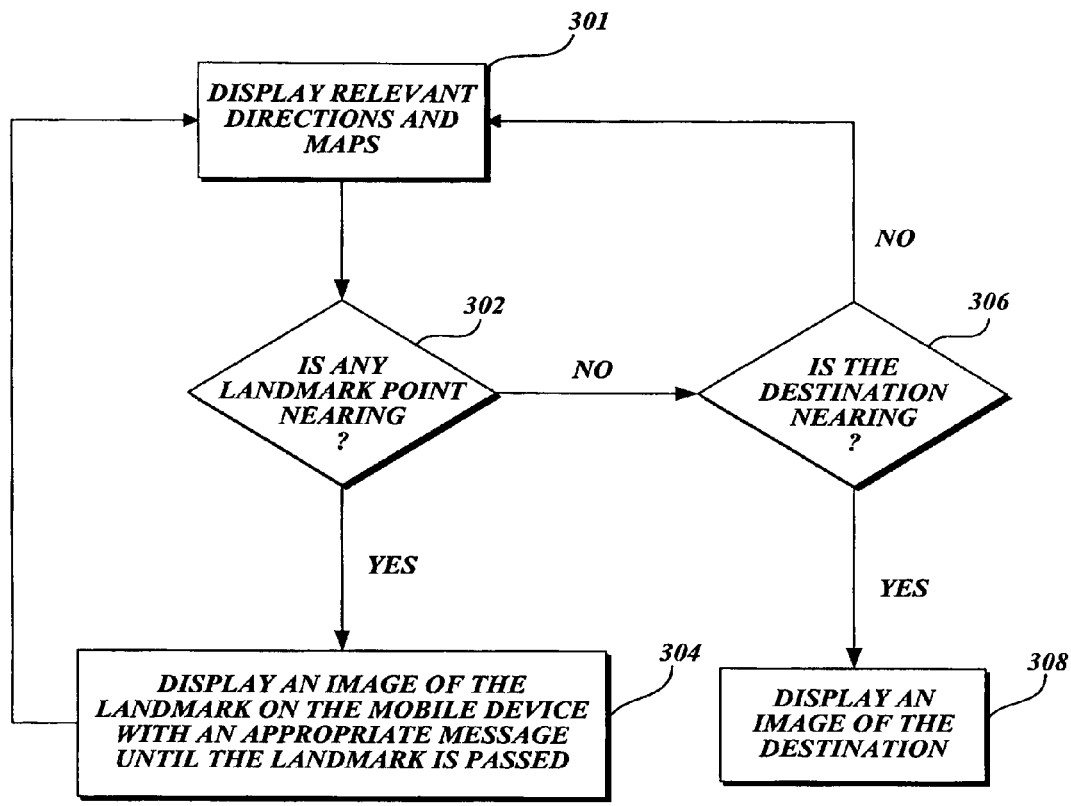
FIG. 3 is a flow diagram illustrating the execution of the navigation program generated in accordance with FIG. 2 above according to one embodiment of the present invention.

FIG. 3 is a flowchart illustrating actions taken when the navigation program generated in accordance with FIG. 2 is executed. At block 301, the navigation program is executed to display relevant directions and maps in a manner well known in the art. For example, a map of the relevant area may be displayed with an icon representative of the mobile device 20 moving on the map in accordance with the actual movement of the mobile device 20 as determined by the position identification system. Suitable directions in graphical and/or text form may also be displayed.

Figure 8:
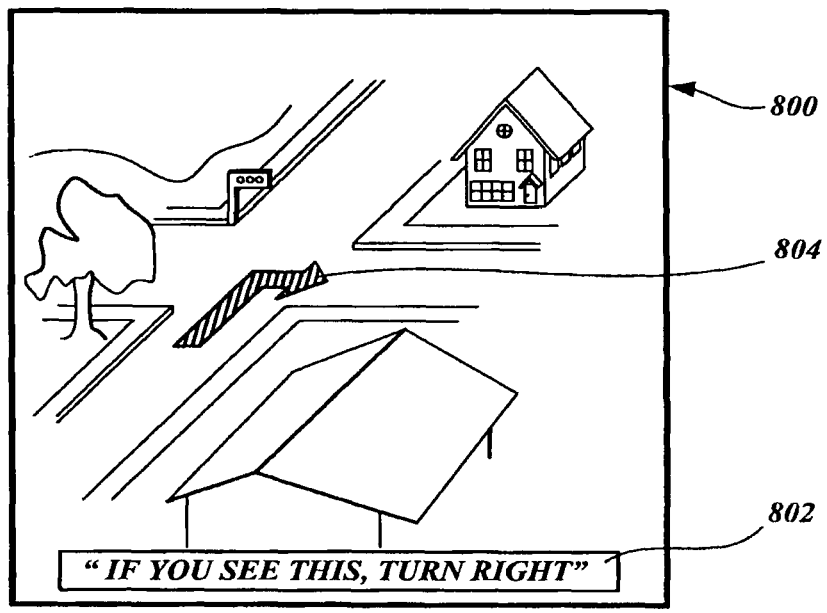
FIG. 8 is a sample screen shot that can be displayed on a mobile device during the execution of a navigation program in accordance with one embodiment of the present invention.

At block 302, it is determined whether any landmark point is nearing. For example, this determination can be made if any of the landmark points comes within a certain distance from the current position of the mobile device 20 as determined by the position identification system. If so, then at block 304, the image of the landmark point that is nearing can be accessed and displayed on the mobile device 20, with an appropriate message, such as "If you see this, turn right," etc. FIG. 8 illustrates a sample screen shot displaying a location-specific image 800 of a landmark point (an intersection in this example), together with suitable directions in both text 802 ("If you see this, turn right") and graphics (a left-turning arrow 804 in the example). The location-specific image 800 can remain displayed until the landmark point is passed. For example, the image 800 can be displayed until the distance between the landmark point and the mobile device 20 starts to increase.

After the mobile device 20 passes the landmark point, returning to block 301 (FIG. 3), the navigation program resumes displaying ordinary maps-and-directions, while continuing to monitor to see if any other landmark point comes close to the mobile device 20 (block 302).

If, at block 302, it is determined that no landmark point is near the mobile device 20, then proceeding to block 306, it is determined whether the final destination location is nearing. This determination can be made, for example, when the final destination location comes within a certain distance from the current position of the mobile device 20 as determined by the position identification system. If so, then proceeding to block 308, the location-specific image of the final destination is displayed on the mobile device 20. An appropriate message, such as "Your destination looks like this," can be displayed at this time. The image may remain displayed until the user (i.e., the mobile device 20) reaches the destination location.

It should be emphasized that FIG. 3 illustrates merely one example of actions to be performed when a navigation program is executed, and accordingly, the navigation program in accordance with the present invention is not limited to the particular embodiment disclosed in FIG. 3. For example, the image of the final destination may be displayed initially upon execution of the navigation program so that the user can view what to look for at his/her destination location prior to starting his/her journey. As another example, a video clip of a series of location-specific images along the way to a final destination (or a portion thereof) may be displayed initially upon execution of the navigation program so that the user can view the entire journey at the outset. As a further example, an image of the final destination may be displayed on the mobile device 20 anytime a user's request for such an image is received.

As further extensions of the present invention, various other services may be provided with respect to each of the location-specific images to be displayed. For example, if a user is traveling to a final destination, such as a restaurant, the user may be permitted to make a reservation at the restaurant upon viewing the location-specific image of the restaurant using his/her mobile device 20. For example, many businesses have Wi-Fi devices which could process various requests, such as reservation requests, received via a wireless communications network 22 from the mobile device 20. As another example, if the final destination is a movie theater, the user of the mobile device 20 may be permitted to purchase movie tickets upon viewing the location-specific image of the movie theater wirelessly over the communications network 22.

Referring back to FIG. 1A, the mobile image system 10 may further include the shopping assistance server 14. The shopping assistance server 14, as illustrated, includes an operating system 32 and a shopping assistance module 34. Briefly, the shopping assistance server 14, in conjunction with the shopping database 45, etc., allows a user of the mobile device 20 to view images of stores that carry items that the user wishes to purchase.

Figure 4:
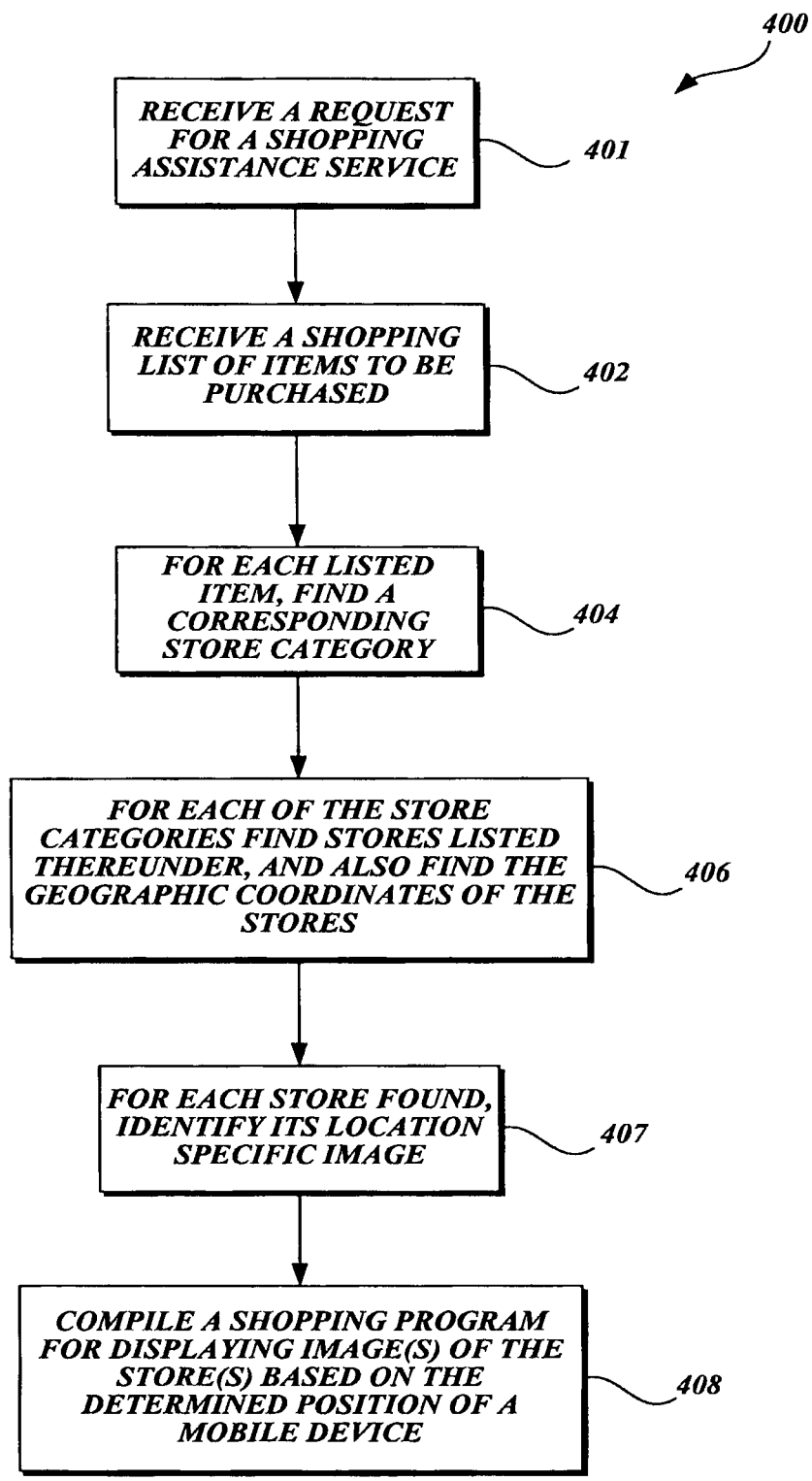
FIG. 4 is a flow diagram of one exemplary method of generating a shopping program which, upon execution, will display one or more location-specific images based on the determined position of a mobile device according to one embodiment of the present invention.

Specifically, FIG. 4 illustrates a sample routine 400 for generating a shopping program in accordance with one embodiment of the present invention. At block 401, the shopping assistance module 34 receives a request for a shopping assistance service from a user of the mobile device 20. At block 402, the module 34 receives a shopping list from the user of the mobile device. For example, the user may enter text into his/her mobile device 20 to list items that the user wishes to purchase (stamps, milk, books, etc.). At block 404, for each of the items, the module 34 finds a corresponding "store category" that carries such an item (e.g., "post offices" for stamps, "grocery stores" for milk, "book stores" for books, etc.) This can be determined based on a predefined look-up table, for example, as stored in the shopping database 45. Alternatively, the user may directly enter the store categories in the shopping list as opposed to the items to be purchased.

At block 406, for each of the store categories entered or found, the module 34 finds one or more stores listed under the store category and also find the geographic (e.g., longitude/latitude) coordinates of these stores. This can be done, for example, by referring to the listings database 42 included in the database server 11. Specifically, in accordance with various exemplary embodiments of the present invention, the listings database 42 lists various stores, businesses, etc., under each store category, together with their addresses, phone numbers, geographic longitude/latitude coordinates, business hours, etc. Therefore, for each of the store category, a list of stores together with their geographic coordinates can be obtained by searching through the listing database 42. In one specific application, only those stores that are actually open (according to their business hours information) are returned based on the day and time at which the shopping list was received, as determined by an internal clock of the mobile device 20 or a clock accessible by the shopping assistance server 14. At block 407, optionally, for each of the stores found, a location-specific image can be found. It should be apparent to one skilled in the art that it is not necessary to retrieve the location-specific images of these stores at this point, it is only necessary to be able to access these location-specific images based on their geographic coordinates and the determined position of the mobile device 20, as will be described below.

At block 408, the module 34 finally compiles a shopping program for displaying images of the stores that sell the items/products included in the shopping list. Each of these images will be displayed based on the position of the mobile device 20 as determined by the position identification system.

It should be understood that the shopping assistance module 34, together with its associated databases, such as the shopping database 45, images database 40, and the listings database 42, etc., may be contained in a hard disk 66 and stored in the memory 54 of the mobile device 20 (see FIG. 1B). Thus, essentially, the shopping assistance service as described above may be made available to the mobile device 20 that may not necessarily interface with a wireless communications network 22.

Figure 5:
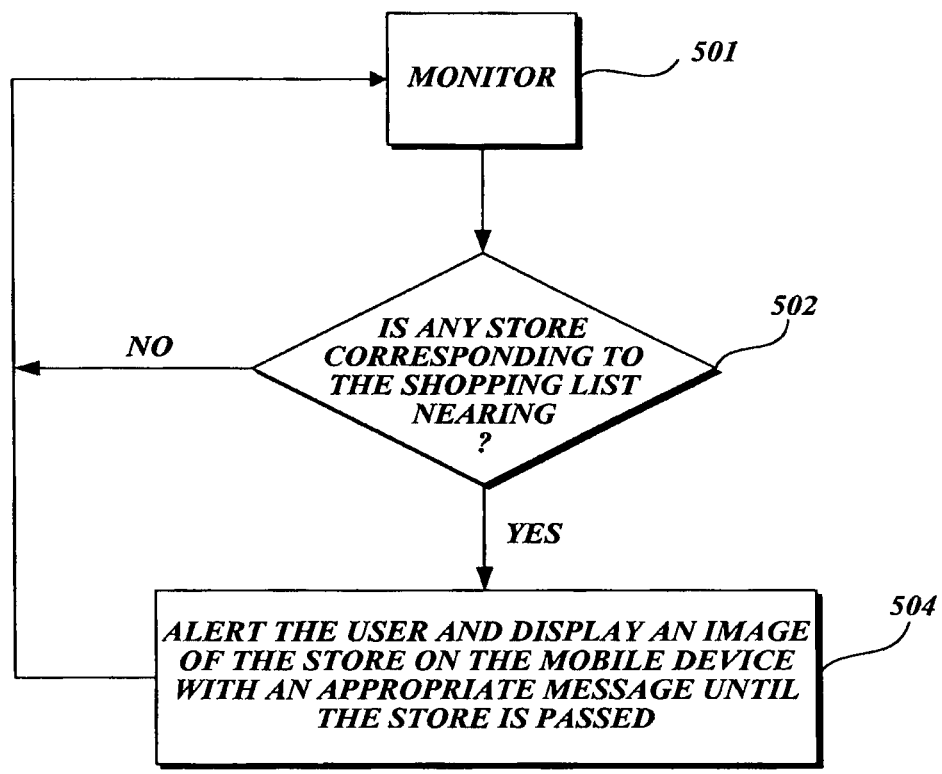
FIG. 5 is a flow diagram illustrating the execution of the shopping program generated in accordance with FIG. 4 above according to one embodiment of the present invention.
Figure 9:
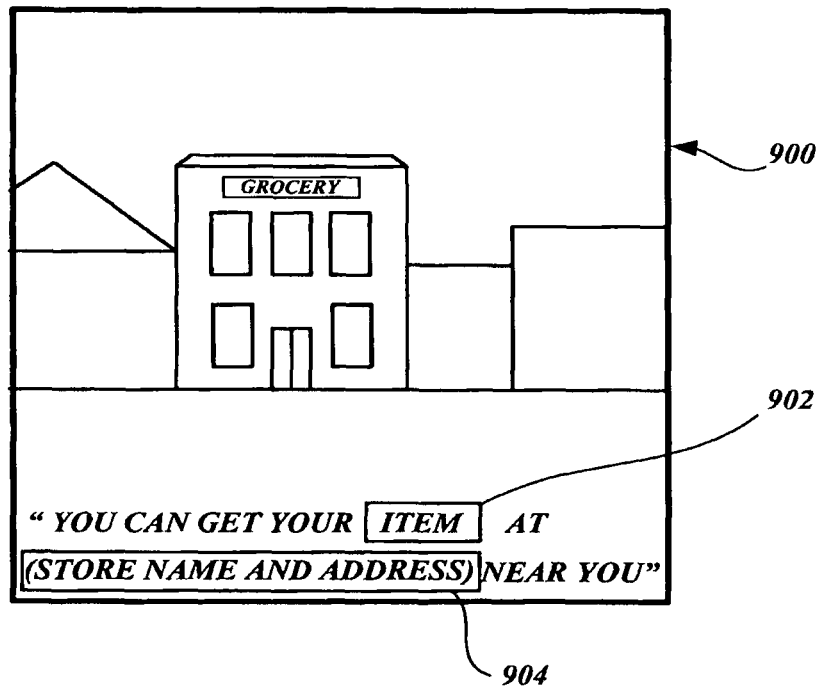
FIG. 9 is a sample screen shot that can be displayed on a mobile device during the execution of a shopping program in accordance with one embodiment of the present invention.

FIG. 5 illustrates actions performed during execution of the shopping program generated in accordance with FIG. 4 above. At block 501, the program monitors for the occurrence of a decision event of block 502. At block 502, it is determined whether any of the stores that may carry an item on the shopping list is nearing the position of the mobile device 20 as determined by the position identification system. For example, this determination can be made if the longitude/latitude coordinates of any of these stores comes within a certain distance from the current position of the mobile device 20. If so, proceeding to block 504, the program alerts the user (for example, by issuing a beeping sound) and displays an image of the store on the mobile device 20 with an appropriate message. FIG. 9 is a sample screen shot displaying an image 900 of the store that is coming close to the mobile device 20, together with a text message that reads "You can get your '_____' (902—insert the relevant item on the shopping list) at '_____' (904—insert the store name and address) near you." In connection with the image of a store 900, directions to the store may further be calculated and displayed by utilizing the navigation server 13 discussed above. The image of the store 900 can be displayed until the user (or more specifically, the user's mobile device 20) reaches or passes the store. For example, this point of time can be determined when the distance from the mobile device to the store starts to increase.

The items to be entered into a shopping list may be general, such as "books," or may be more specific, such as a particular title of a book. In one example, the mobile image system 10 of the present invention may be coupled via the wireless communications network 22 with searchable inventory databases of various bookstores. Then, a particular book title entered in a shopping list as received from the mobile device 20 of a user can be searched within these inventory databases to identify only those bookstores that actually carry this particular title. In this example, in FIG. 4, block 406, only those bookstores that carry this particular title, together with their geographic coordinates, are found. Thereafter, in block 408, a shopping program is compiled for displaying location-specific images of only those bookstores.

Referring again back to FIG. 1A, the mobile image system 10 may further include the recommendations server 16. The recommendations server 16, as illustrated, includes an operating system 36 and a recommendations module 38. The recommendations server 16, in conjunction with the user profiles database 46, the image-address database 43, etc., may cause the mobile device 20 to display location-specific images of the user's "favorite" places. As before, these images will be displayed based on the determined position of the mobile device 20. Each user's "favorite" places are determined in reference to the data contained in the user profiles database 46. Specifically, for each user having a user ID, the user profiles database 46 stores his/her favorite places or information that can be used to determine his/her favorite places in association with his/her user ID.

A user may actively (explicitly) enter his/her favorite places into the user profiles database 46, for example, by typing in the addresses of the favorite places. Alternatively, a user's favorite places may be presumed (determined) based on the user's observed behavior on the mobile image system 10. For example, when the user accesses the navigation service provided by the navigation server 13 and enters a certain destination location, the destination location may be presumed to be the user's favorite place and stored as such in the user's profile. Likewise, if the user accesses the shopping assistance service provided by the shopping assistance server 14 and enters a shopping list including certain items, the stores that carry those items may be presumed to be the user's favorite places and added to the user's profile. As another example, if a user's profile contains a list of the user's favorite books, for each of these books, a list of geographic locations that appear in the book may be compiled (e.g., the name of a restaurant that a book's main character visits). Then, these geographic locations may be presumed to be the user's favorite places, and added to the user's profile in the database 46. Further alternatively, if no information is available regarding the preferences or past behavior of a particular user, general favorite places (e.g., favorite places of other users) may be presumed to be one of this user's favorite places also. Therefore, each user of the mobile device 20 accessing the recommendations service has a user ID, and has an associated user profile included in the user profiles database 46 (although the amount and content of information included in each user profile may vary), which can be used to determine the user's favorite places. Note that a user ID does not necessarily coincide with a device ID; in some applications one mobile device may be shared by multiple users each having his/her own user ID and a user profile.

Figure 6:
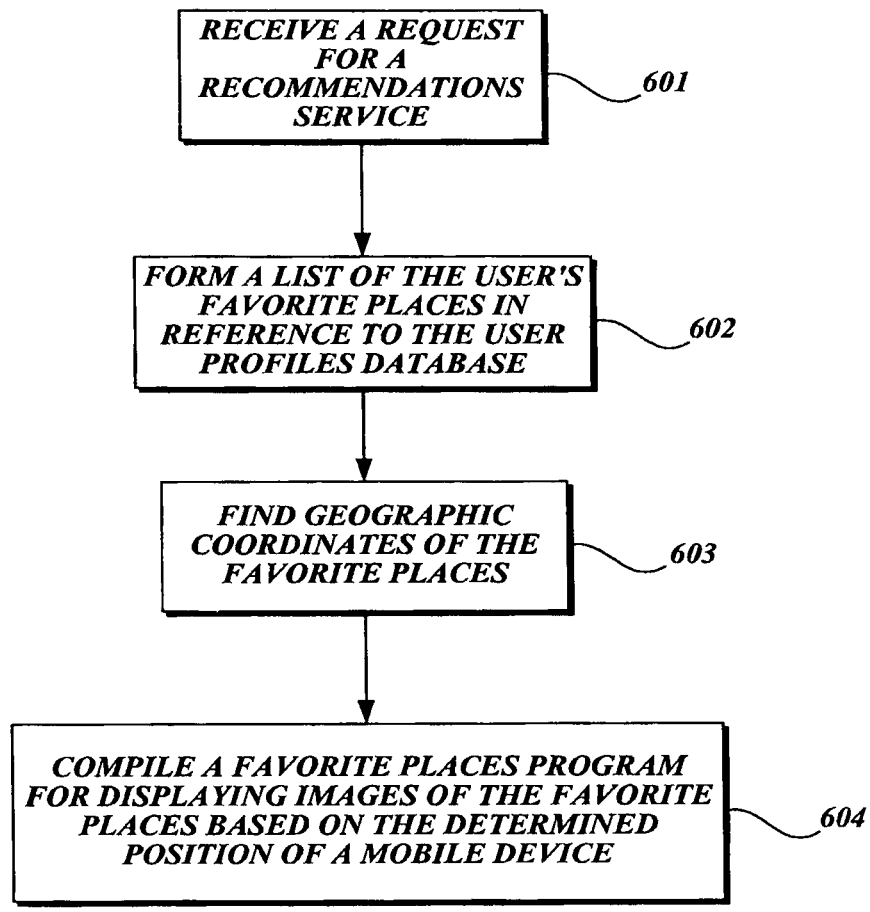
FIG. 6 is a flow diagram of one exemplary method of generating a favorite places program which, upon execution, will display one or more location-specific images based on the determined position of a mobile device according to one embodiment of the present invention.

FIG. 6 is a flow chart illustrating a sample routine 600 for generating a favorite places program in accordance with one embodiment of the present invention. At block 601, the recommendations module 38 receives a request for a recommendations service from the mobile device 20. At block 602, the module 38 forms a list of the favorite places of the user requesting the recommendations service. To this end, the module 38 refers to the user profiles database 46 and retrieves the user's favorite places stored in the user's profile and/or determines the user's favorite places based on the information contained in the user's profile. At block 603, the module 38 then finds geographic coordinates for each of the user's favorite places, in reference to the image-address database 43. Finally, at block 604, the module 38 compiles a favorite places program for displaying location-specific images of the favorite places when the user is near or at these favorite places, based on the determined position of the mobile device 20.

Figure 7:
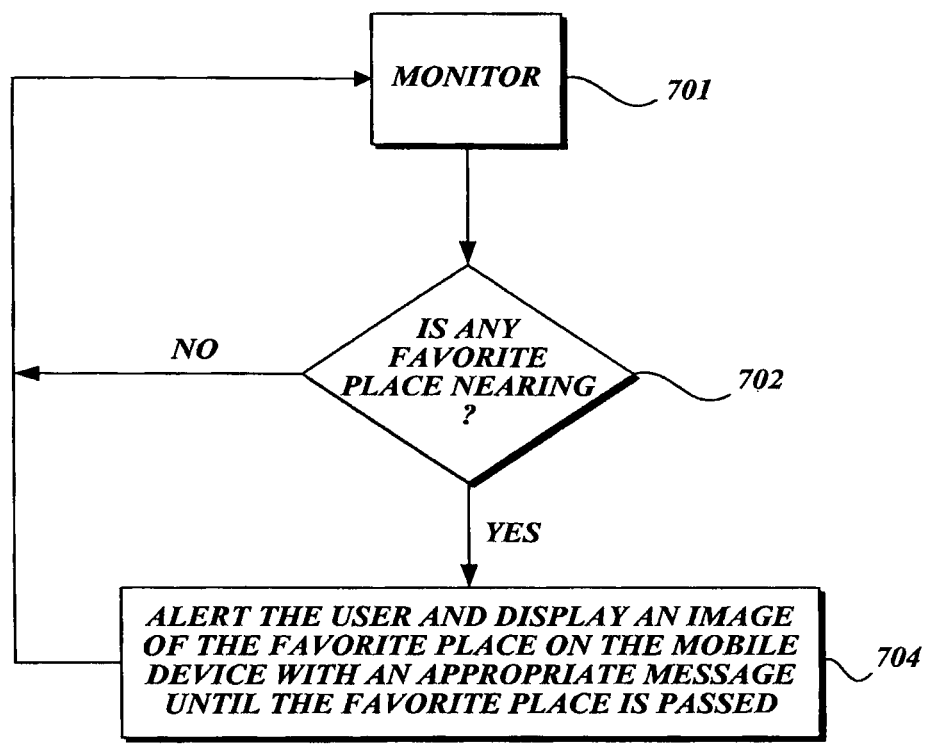
FIG. 7 is a flow diagram illustrating the execution of the favorite places program generated in accordance with FIG. 6 above according to one embodiment of the present invention.

FIG. 7 is a flowchart illustrating actions taken during execution of the favorite places program generated in accordance with FIG. 6. At block 701, the program monitors for the occurrence of a decision event of block 702. At the decision block 702, it is determined whether any of the favorite places is nearing. For example, this determination can be made when the determined position of the mobile device 20 comes within a certain distance from the longitude/latitude coordinates of any of the favorite places. If so, at block 704, the program alerts the user (e.g., by issuing a beep sound), and displays an image of the favorite place on the mobile device 20 together with an appropriate message.

Figure 10:
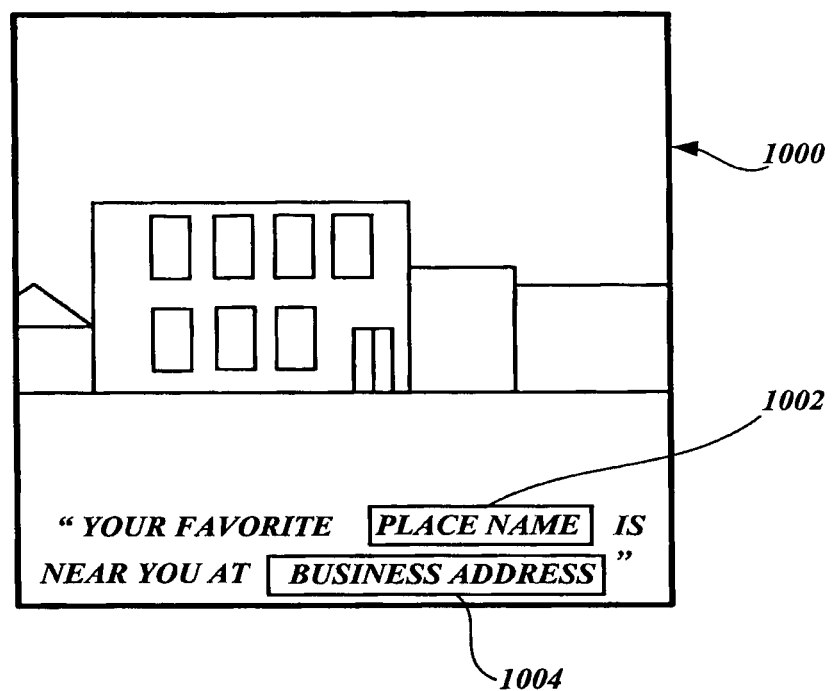
FIG. 10 is a sample screen shot that can be displayed on a mobile device during the execution of a favorite places program in accordance with one embodiment of the present invention.

FIG. 10 is a sample screen shot displaying an image 1000 of a favorite place (a library in this example) that is coming close to the mobile device 20, together with a text message that reads "Your favorite '_____' (1002—insert the place name, for example "library") is near you at '_____' (1004—insert the place address)." In connection with the image of the favorite place 1000, directions to the favorite place may further be calculated and displayed by utilizing the navigation server 13 discussed above. The image of the favorite place can remain displayed until the user (or more specifically, the user's mobile device 20) reaches or passes the favorite place.

In various applications of the present invention, a location-specific image selected for a user based on his/her user ID may be supplemented with further information available from his/her user profile. For example, when an image of a place that the user has visited in the past is selected based on his/her user profile, the date on which the user last visited the place may be obtained and used to calculate the period of time that has passed since that time. Then, the image can be displayed on the user's mobile device together with a message such as "It's been '_____' months/years since you last visited your favorite '_____' (insert the place name, address, etc.)." Other types of supplemental information to annotate a selected image include, for example, a list of items that the user has purchased at a place in the image, or a title of a book in which a place in the image appears together with any rating that the user has given to the book.

Accordingly, the present invention provides methods and systems that permit a user of a mobile device to view location-specific images in various situations, for example when trying to reach a certain destination location or to purchase items on a shopping list. In all of these situations, the methods and systems display location-specific images based on the determined position of the mobile device so that the location-specific images are displayed in a timely and geographically relevant manner to assist the user in finding and reaching the desirable locations.

While the preferred embodiments of the invention have been illustrated and described, it will be appreciated that various changes can be made therein without departing from the spirit and scope of the invention.

What is claimed is:

1. A computer-implemented method of displaying a location-specific image on a mobile device, comprising:
    under control of one or more computer systems configured with executable instructions,
        receiving information identifying a location of the mobile device;
        receiving a user identification information (user ID) of the mobile device;
        accessing a user profile associated with the received user ID, the user profile comprising information corresponding to at least one of preferences or past behavior of the user;
        selecting a location-specific image from a plurality of location-specific images based at least in part upon the identified location of the mobile device and based at least in part on at least one of the preferences or past behavior of the user, each location-specific image being associated with geographic coordinates of a location at or near which the image was taken; and
        sending the selected image to the mobile device, wherein the mobile device is configured to display a location-specific image corresponding to a current location of the mobile device.

2. The computer-implemented method of claim 1, wherein the location-specific image is selected when the identified location of the mobile device comes within a specified distance from the geographic coordinates associated with the image.

3. The computer-implemented method of claim 1, further comprising:
    determining, at least one recommended location proximate to the current location of the mobile device based at least one of demographic information, user preferences, or information associated with past behavior derived from the user profile; and
    wherein selecting the location-specific image comprises selecting an image associated with the at least one recommended location.

4. A mobile device, comprising:
    a device processor;
    a display screen; and
    device memory storing instructions that, when executed by the device processor, cause the mobile device to:
        receive information identifying a location of a mobile device;
        receiving a user identification information (user ID) of the mobile device;
        access a user profile associated with the received user ID, the user profile comprising information corresponding to at least one of preferences or past behavior of the user;
        select a location-specific image from a plurality of location-specific images based at least in part upon the identified location of the mobile device and based at least in part on at least one of the preferences or the past behavior of the user, each location-specific image being associated with geographic coordinates of a location at or near which the image was taken; and
        display a location-specific image corresponding to a current location of the mobile device.

5. The computer-implemented method of claim 1, further comprising:
    determining supplemental information for the selected image based on the received user ID; and
    sending the supplemental information to the mobile device.

6. The mobile device of claim 4, wherein the location identification system comprises a GPS receiver coupled with the mobile device, and the location of the mobile device is determined by the GPS receiver.

7. The computer-implemented method of claim 1, further comprising:
    receiving a search query from the mobile device; and
    wherein selecting the location-specific image is based further on the received search query.

8. The computer-implemented method of claim 1, wherein said receiving a location of a mobile device includes at least one of receiving a location of a mobile device as entered into the mobile device by a user, receiving a location of a mobile device from a GPS receiver, or receiving a location of a mobile device from a wireless communications network with which the mobile device interfaces.

9. The computer-implemented method of claim 8, further comprising:
    determining a general geographic location of the mobile device based on an IP address associated with the mobile device;
    identifying a subset of location-specific images that correspond to the determined general geographic location of the mobile device; and
    wherein selecting the location-specific image comprises selecting the location-specific image from the identified subset of location-specific images based on the determined general geographic location of the mobile device.

10. The computer-implemented method of claim 1, further comprising:
    receiving an image captured by the mobile device and associated with a location at which the image was taken; and
    storing the image with the associated location.

11. A non-transitory computer-readable storage medium having computer-executable instructions stored thereon that, when executed by a computer, cause the computer to:
    receive location information for a mobile device;
    receive a user identification information (user ID) of the mobile device;
    access a user profile associated with the received user ID, the user profile comprising information corresponding to at least one of preferences or past behavior of the user;
    select a location-specific image from a plurality of location-specific images based at least in part upon the received location information and based at least in part on at least one of the preferences or past behavior of the user, each location-specific image being associated with geographic coordinates of a location at or near which the image was taken; and
    send the selected image to the mobile device, wherein the mobile device configured to display a location-specific image corresponding to a current location of the mobile device.

12. The mobile device of claim 4, further comprising:
    a wireless network interface for establishing a wireless communications link between the mobile device and a mobile image system via a wireless communications network, wherein the location identification system utilizes a network-based technology to determine the location of the mobile device based on a link between the mobile device and the mobile image system over the wireless communications network.

13. The non-transitory computer-readable storage medium of claim 11, wherein the instructions, when executed, further cause the computer to:
   receive a search query from the mobile device; and
   wherein selecting the location-specific image is based further on the received search query.

14. The computer-readable storage medium of claim 11, wherein the instructions, when executed, further cause the computer to:
   determine supplemental information for the selected image based on the received user ID; and
   send the supplemental information to the mobile device.

15. The non-transitory computer-readable storage medium of claim 11, wherein the instructions, when executed, further cause the computer to:
   determine a general geographic location of the mobile device based on an IP address associated with the mobile device;
   identify a subset of location-specific images that correspond to the determined general geographic location of the mobile device; and
   wherein selecting the location-specific image further comprises selecting the location-specific image from the identified subset of location-specific images based on the determined general geographic location of the mobile device.

* * * * *